(12) United States Patent
Acharya et al.

(10) Patent No.: US 6,285,796 B1
(45) Date of Patent: Sep. 4, 2001

(54) PSEUDO-FIXED LENGTH IMAGE COMPRESSION SCHEME

(75) Inventors: Tinku Acharya, Tempe, AZ (US); Judith A. Goldstein, Hillsboro; Michael Keith, Portland, both of OR (US); Po Yuan, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 08/963,335

(22) Filed: Nov. 3, 1997

(51) Int. Cl.⁷ .............................. H04N 1/41; G06K 9/36
(52) U.S. Cl. ........................... 382/246; 358/427
(58) Field of Search ................ 358/261.2, 430; 348/397, 398; 382/239, 240, 238, 232, 251, 246

(56) References Cited

U.S. PATENT DOCUMENTS

| | | | |
|---|---|---|---|
| 4,698,672 * | 10/1987 | Chen et al. | 358/261 |
| 4,920,426 * | 4/1990 | Hatori et al. | 358/433 |
| 4,922,273 * | 5/1990 | Yonekawa | 358/429 |
| 5,184,229 * | 2/1993 | Saito et al. | 358/261.3 |
| 5,218,563 * | 6/1993 | Juri | 364/745 |
| 5,289,548 * | 2/1994 | Wilson et al. | 358/433 |
| 5,341,442 * | 8/1994 | Barrett | 382/56 |
| 5,497,246 * | 3/1996 | Abe | 382/248 |
| 5,675,666 * | 10/1997 | Komuro et al. | 382/232 |
| 5,694,346 * | 12/1997 | Milano | 364/725 |
| 5,883,979 * | 3/1999 | Beretta et al. | 382/251 |
| 5,905,812 * | 5/1999 | Kim | 382/236 |
| 6,009,205 * | 12/1999 | Yoshida | 382/246 |
| 6,148,028 * | 11/2000 | Kikuchi | 375/240 |

FOREIGN PATENT DOCUMENTS

WO9826600 * 6/1998 (WO) ............... H04N/1/40

\* cited by examiner

*Primary Examiner*—Jerome Grant, II
(74) *Attorney, Agent, or Firm*—Blakely, Sokoloff, Taylor & Zafman LLP (57) ABSTRACT

A method and apparatus for efficient image encoding in a predictive coding or other error image based image compression scheme, a pseudo-fixed length code is employed to convert certain calculated error values into codewords. The code is pseudo-fixed length since the length of codewords is fixed for a particular range of values and then increased for the next range. The length of codewords is not needed in decoding by choosing prefixes that uniquely distinguish codewords when packed together. As a result, efficient and quick image encoding/decoding is made possible.

20 Claims, 6 Drawing Sheets

TABLE 1

| Q-VALUE | INDEX | PFL-CODE | |
|---|---|---|---|
| 0 | 0 | 000 | |
| 5 | 1 | 001 | LOW FREQUENCY QUANTIZER |
| -5 | 2 | 010 | |
| 15 | 3 | 011 | |
| -15 | 4 | 100 | |
| 32 | 5 | 101 | |
| -32 | 6 | 110 | |
| 48 | 7 | 111000 | |
| -48 | 8 | 111001 | HIGH FREQUENCY QUANTIZER |
| 80 | 9 | 111010 | |
| -80 | 10 | 111011 | |
| 128 | 11 | 111100 | |
| -128 | 12 | 111101 | |
| 192 | 13 | 111110 | |
| -192 | 14 | 111111 | |

TABLE 1

| Q-VALUE | INDEX | PFL-CODE | |
|---|---|---|---|
| 0 | 0 | 000 | LOW FREQUENCY QUANTIZER |
| 5 | 1 | 001 | |
| -5 | 2 | 010 | |
| 15 | 3 | 011 | |
| -15 | 4 | 100 | |
| 32 | 5 | 101 | |
| -32 | 6 | 110 | |
| 48 | 7 | 111000 | HIGH FREQUENCY QUANTIZER |
| -48 | 8 | 111001 | |
| 80 | 9 | 111010 | |
| -80 | 10 | 111011 | |
| 128 | 11 | 111100 | |
| -128 | 12 | 111101 | |
| 192 | 13 | 111110 | |
| -192 | 14 | 111111 | |

PSEUDO-FIXED LENGTH IMAGE COMPRESSION SCHEME

BACKGROUND OF THE INVENTION

1. Field of the Invention

The invention relates generally to image compression. More specifically, the invention relates to encoding and quantization for image compression.

2. Description of the Related Art

Image compression techniques can be classified as either "lossy" or "lossless". With lossless compression, the original image prior to compression can be exactly recovered when the compressed image is decompressed. Consequently, lossless techniques, whose compression ratios depend upon the entropy of an image, do not achieve high compression ratios and, since they preserve a high percentage of original image information, are computationally expensive. By contrast, lossy compression schemes provide only an approximation of the original image. Thus, with lossy compression, greater compression ratios can be achieved but with loss in image quality compared to lossless techniques. One such lossy technique referred to as "predictive coding" (also called Digital Pulse Code Modulation (DPCM) which is well-known in the art) predicts the value of a successive pixel (pixels are color components related by spatial row, column position) by linearly combining the properties of already processed neighboring pixels. An error pixel is defined as the difference between the original image pixel and the corresponding predicted pixel. The error pixel is first quantized and then binary encoded. Traditionally, the binary encoding involves either using a fixed-length code or variable-length code which encodes the quantized error pixel (value). In the variable-length encoding situation, quantized error values will have different lengths based upon the number of bits needed to represent the value in binary. Strictly variable-length code is difficult to decode and hard to implement in a parallel data system. Variable-length encoding is inherently serial in nature since there is a wide possible variation in the lengths of the quantized error codes. Parallelism is utilized in newer multimedia systems such as the Intel's Pentium® processor with MMX™ technology which is a SIMD (Single Instruction Multiple Data) platform. In such a platform, decoding or decompression of variable-length encoded images is not optimized for attaining the best processor utilization.

For videoconferencing or still imaging by digital cameras, a sequential process such as variable-length encoding is disadvantageous due to the increased time taken to process bits sequentially. This causes the encoding or compression process on the digital camera to be less of a real-time operation, and consequently, the videocorferencing session will be less like a real-time transmission, which is undesirable.

Commercially widespread and well-known lossy compression techniques, such as JPEG (Joint Photographic Experts Group) or MPEG (Motion Pictures Experts Group), are not specifically developed for 8-bit Bayer pattern color images which are usually generated in camera sensors. The 8-bit Bayer color imaging pattern is exemplified by every pixel location containing a single color component either R, G, or B. The Bayer pattern is shown below:

GRGR . . .
BGBG . . .
GRGR . . .
BGBG . . .

If the final image is to be of 24-bit resolution pixels, each pixel having an R, G, and B color component, color interpolation and conversion may be needed for JPEG type compression. To perform this interpolation on circuitry in the digital camera or imaging device is cost prohibitive. A further disadvantage of MPEG and JPEG is that while compressing, they can operate only upon N pixel by N (usually N=8 or 16) pixel blocks, and thus create a need for more memory circuits. While cheap, additional memory circuits are still disadvantageous in that they occupy chip/device area, leading to a more expensive/larger camera. More importantly, the need to collect and store blocks of data decreases the overall speed of the compression process which is also not desirable in imaging conferencing.

Further high compression ratio block-based algorithms such as JPEG suffer from deficiencies such as "blocking artifacts". For block-based algorithms, an image is divided into blocks of pixels such as 8×8, or 16×16 blocks. These blocks are processed independently of each other and thus, between blocks, there is an observable discontinuity in luminance or color which constitutes a "blocking artifact". Additionally, block-based algorithms (JPEG/MPEG) rely on transformation of original blocks from space domain to frequency domain. Hardware implementation of these transformations is usually computationally expensive and complex.

Thus, there is a need for an image compression technique which is computationally inexpensive such as to reduce the cost of the digital cameras on which they are employed. Additionally, there is a need for enhancing the speed of capture and compression so that the resultant imaging can be performed more real-time. Additionally, compression must be more guaranteed, and not be subject to expansion of the image due to noise, and preserve quality.

SUMMARY OF THE INVENTION

The invention, in one embodiment is a method for compressing an image using a pseudo-fixed length image compression technique and transferring the image to a destination for retrieval and decompression

BRIEF DESCRIPTION OF THE DRAWINGS

The objects, features and advantages of the method and apparatus for the present invention will be apparent from the following description in which.

DETAILED DESCRIPTION OF THE INVENTION

Referring to the figures, exemplary embodiments of the invention will now be described. The exemplary embodiments are provided to illustrate aspects of the invention and should not be construed as limiting the scope of the invention. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware or combinations thereof.

Figure 1:
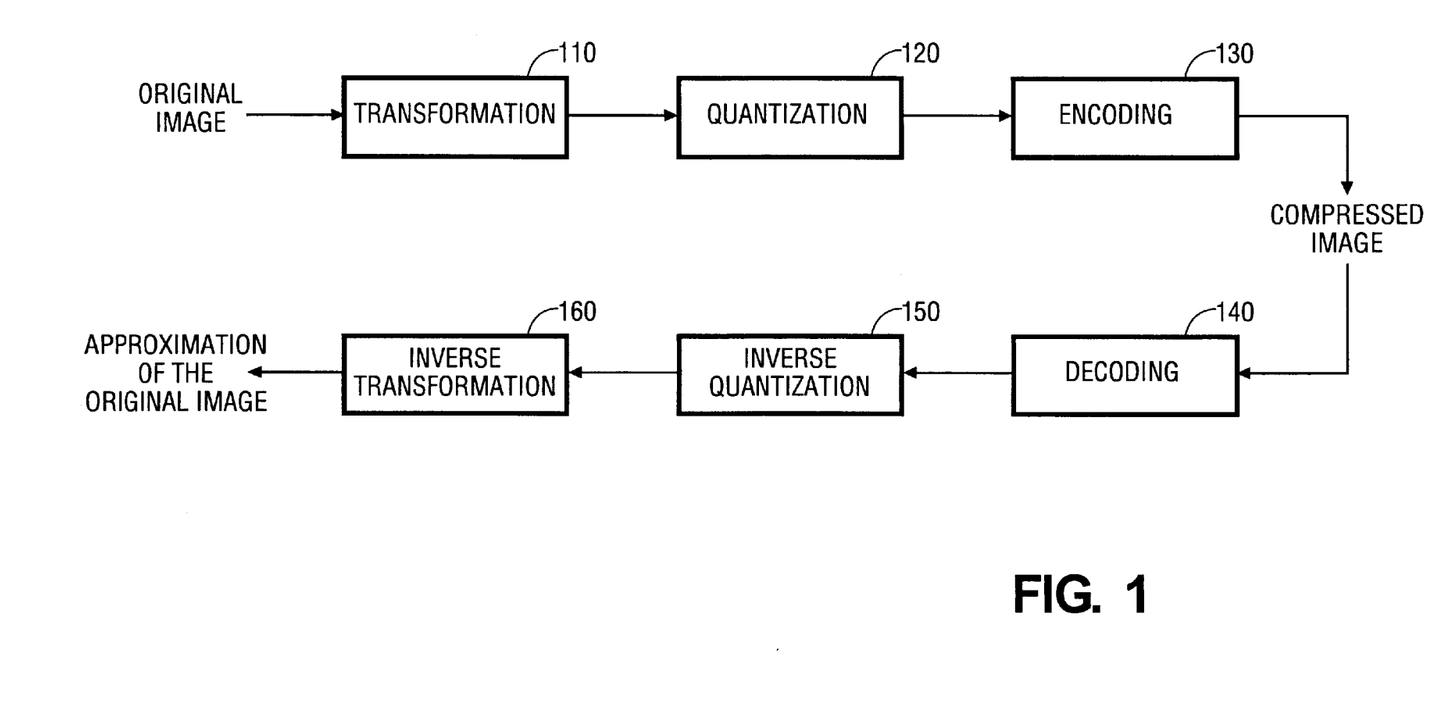
FIG. 1 illustrates a lossy compression data flow according to one embodiment of the invention.

FIG. 1 illustrates a lossy compression data flow according to one embodiment of the invention.

It is desirable in imaging applications such as videoconferencing that an original image such as one captured by a digital camera be compressed in size as much as possible while maintaining a certain level of quality prior to its being transferred for decompression and displayed. Ideally, the compression algorithm chosen can be applied to any kind of data transfer mechanisms. However, the disclosed compression and encoding algorithm has been specifically developed to meet the requirements of video transfer through serial bus having the designation Universal Serial Bus (USB), but can be easily modified to suit any other kind of data transfer mechanism.

Lossy compression provides at the output or decompression end only an approximation of the original image. This approximation may match more or less closely the original image based in part upon the particular image compression scheme utilized. Most lossy image compression schemes have a general operation as shown in FIG. 1. Each of the blocks shown in FIG. 1 are functionally represented and may be implemented in hardware, software or firmware or a combination thereof.

First, either by pixels or groups of pixels, an original image is passed through a transformation block 110. The transformation is inter-frame and thus, does not require the input of pixels of another image or frame but rather only neighboring pixels of the same image or frame. The transformation of the image may include scaling (reducing or increasing the total number of pixels (resolution) of the image), pixel substitution (substituting a neighboring pixel for a dead pixel that has been (captured) and gamma correction (correcting for light intensity errors in pixels). The transformation process may also include a procedure such as DPCM (Differential Pulse Code Modulation) which reduces the original image into an error image. The error image is a set of difference (between the original pixel and an approximation or prediction of neighboring pixels) pixels. The use of an error image will tend to reduce the need to encode pixel values that are highly correlated to neighboring pixels and are thus redundant in that they offer no significant image details. By transforming the original image into an error image, perfectly correlated neighboring pixels (no light intensity variation) might be represented as zeros instead of as two identical pixel color/intensity values that are probably greater than zero. This reduces the total number of bits that would be required to represent the image, and the higher the correlation/redundancy, the lower the compression "ratio" (the size in bits of the original image proportional to the size in bits of the compressed image).

Once transformed, a further procedure called quantization is performed using a quantizer 120. Quantization is the procedure of mapping a set of M values to a set of N values, where N<M. By quantizing, the total number of possible data values for the error image data set are reduced. The mapping is achieved according to some mathematical formula such as $y=\sqrt{x}$, where x is the error value and y is the quantized value. With such a formula, the number of total bits needed to represent the image is diminished. While this introduces some error, there are several methods in the art which can be employed to reduce the error. After the transformed image data is quantized, it is then encoded by an encoder 130. Encoder 130 arranges (packs) the quantized data so that it has a convenient representation. One aspect of various embodiments of the invention entails the use of pseudo-fixed length encoding. As will be described in greater detail below, pseudo fixed-length encoding uses a very small number of different encoded "word" sizes to encode the quantized values. For instance, when there are 32 possible quantized values, it may be desirable to encode 16 of those values in 3 bits and the remaining 16 values in 6 bits. The compressed image 140 is essentially a collection of quantized and encoded binary values representing pixels of the transformed image. The compressed image 140 may then be stored onto a media, transmitted from one device to another (such as from camera to computer) or distributed over a communication pathway such as a network. Further, the compressed image data need not be collected and transferred as a single frame, but can be streamed, encoded value by encoded value, out to its destination.

The above functional blocks, 110–130, illustrate a compressor function the objective of which is to reduce the memory requirements of storing and transferring image data. Depending upon the methodology used for transformation, quantization and encoding, the compression ratio, which the size of the original image divided by the size of the compressed image, will vary. This embodiment of the invention provides for an enhanced encoding process that can serve to advantageously increase quality, decrease the complexity of decompress and optimize the compression ration.

The decoding block 140, inverse quantization block 150 and inverse transformation block 160 comprise a decompression block which attempts to recover the original image from the compressed image. The decompressed image obtained will not be an exact pixel-for-pixel reconstruction of the original image, since, the compression is "lossy". However, with suitable transformation and quantization techniques, the level of loss can be decreased and the quality of the decompressed image can be increased.

Decoding block 140 is the reverse of encoding block 130 and impacts encoded pixel values back into their quantized form. Decoding block 150 is pseudo-fixed length decoder and is advantageous over a variable-length encoder according to the prior art in that the number of bits (word size) of the value can easily be determined merely by the existence or absence of certain prefix bits which are part and parcel of the encoded value. The quantized values derived from an inverse look-up of codeword values (see Table of FIG. 4) for pixels are passed to an inverse quantizer which computes an inverse of the function used to quantize in quantization block 120. Thus, if quantization block 120 used $y=\sqrt{x}$, when y is the resultant quantized value and x, the transformed image pixel (data) value, then inverse quantization block 150 would generate recovered inverse quantized values according to $x=y^2$, where y is the quantized value obtained from decoding and x, the recovered or inverse quantized value.

Inversed quantized image data from inverse quantization block 150 is then passed to inverse transformation block 160. Inverse transformation block 170 performs the reverse function of transformation block 110. Inverse transformation reconstructs an approximate version of the original image from the inverse quantized values. Due to the "loss" in transformation and quantization the resultant reconstructed image only approximates the original image. The Decompression block 20 can be implemented as hardware, software or from one or a combination thereof and can be separate physically from the apparatus performing the function of the compression block 10. The basic data flow for lossy compression schemes consist of compression and decompression and often will also include an intermediate transfer from the compression block to the desired destination which has access to decompression instrumentally.

One aspect of various embodiments of the invention is the utilization of a pseudo-fixed length encoder and, subsequently, a pseudo-fixed length decoder. This encoder and decoder will be described in detail below.

Figure 2:
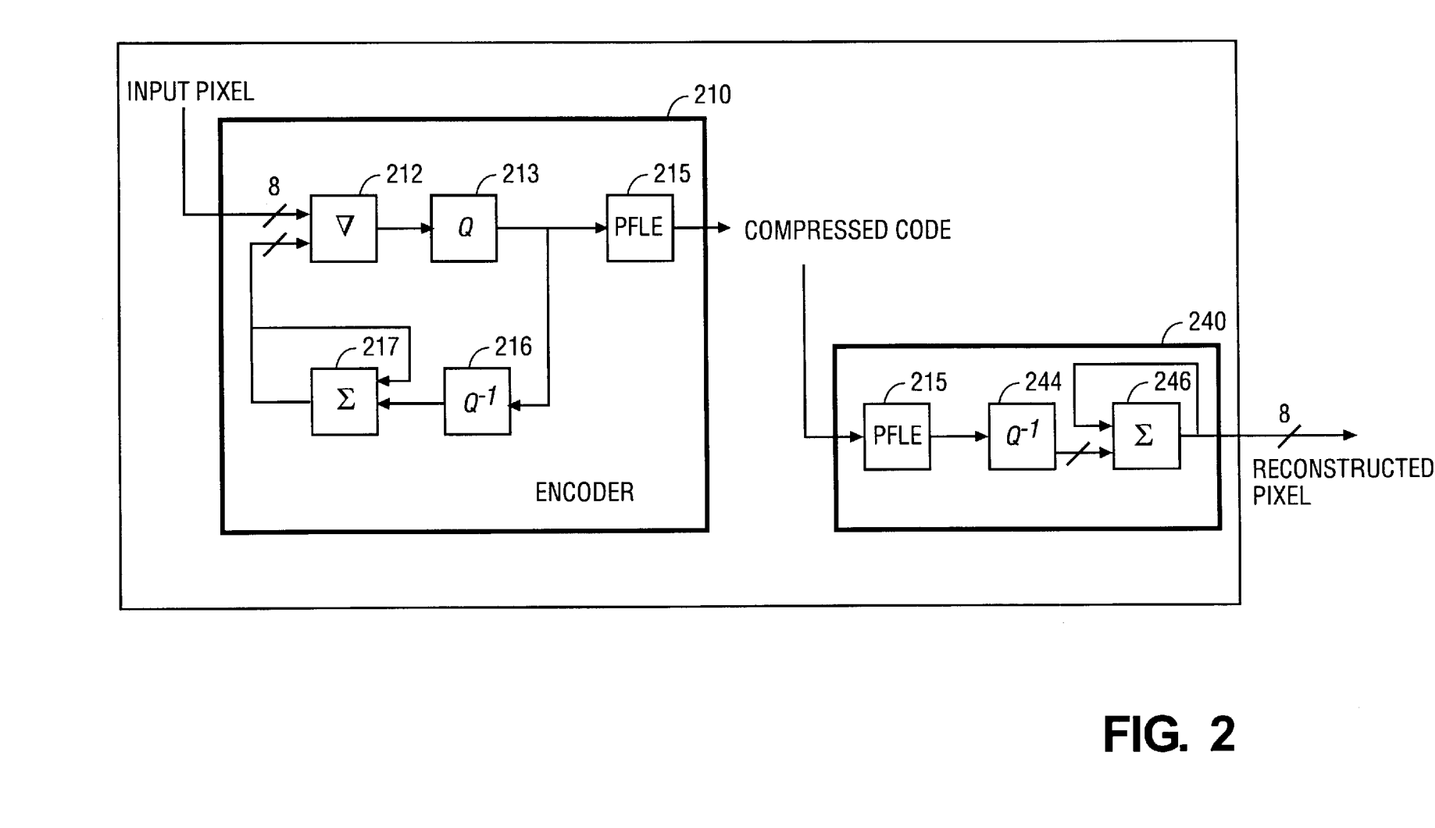
FIG. 2 illustrates an image compression-decompression scheme according to one embodiment of the invention.

FIG. 2 illustrates an image compression-decompression scheme according to one embodiment of the invention.

FIG. 2 shows a predictive error compression unit 210 used to compress images and a decompression unit 240.

Compression unit 210 has a differential unit 212 which takes the error between a predicted pixel value and the current pixel value being processed. The scheme of FIG. 2 is designed for inter-frame pixel-by-pixel image processing. The differential unit 212 generates an error value which is the difference between a predicted pixel and, a pixel of the original image. This error value is quantized into a particular "level", which allows for a reduction in the number of different values and thus number of bits encoded. A quantization formula of $y=\sqrt{x}$, for example, as mentioned above with respect to FIG. 1, can reduce by a large factor the total number of values considered in the encoding process.

As mentioned above, the generation of error pixels depends upon predicting a pixel value. The prediction is achieved by inverse quantizing the output of quantizer 213. This in itself introduces another level of error. For instance, if an error value of 31 were quantized as 5 (according to $y=\sqrt{x}$ since $\sqrt{31}=5$, and the fractional portion is truncated) then the inverse quantization of 5 would yield 25. Thus, to mitigate the propagation of error from pixel-to-pixel, a feedback is introduced. Sumer 217 generates a predicted pixel value by summing a feedback previous predicted pixel value together with the inverse quantized current pixel value. The resultant is passed to differential unit 212 to be subtracted from the next input pixel value from the original image. This feedback minimizes the propagation of error from the error calculation one pixel to the next.

An error value which is output by differential unit 212 is passed to quantizer 213 and is mapped according to some formula such as $y=\sqrt{x}$. The output of the quantizer, in addition to being fed back, is also passed to a PFLE (pseudo-fixed length encoder) 215.

Pseudo-fixed length encoder 215 is unlike traditional encoding apparatus in that it is neither strictly variable nor strictly fixed length encoding. The general concept of pseudo-fixed length encoding is to split the quantized character of an image into "high frequency" and "low frequency" error values. The "frequency" of values refer to the magnitude of quantized values.

Figure 3:
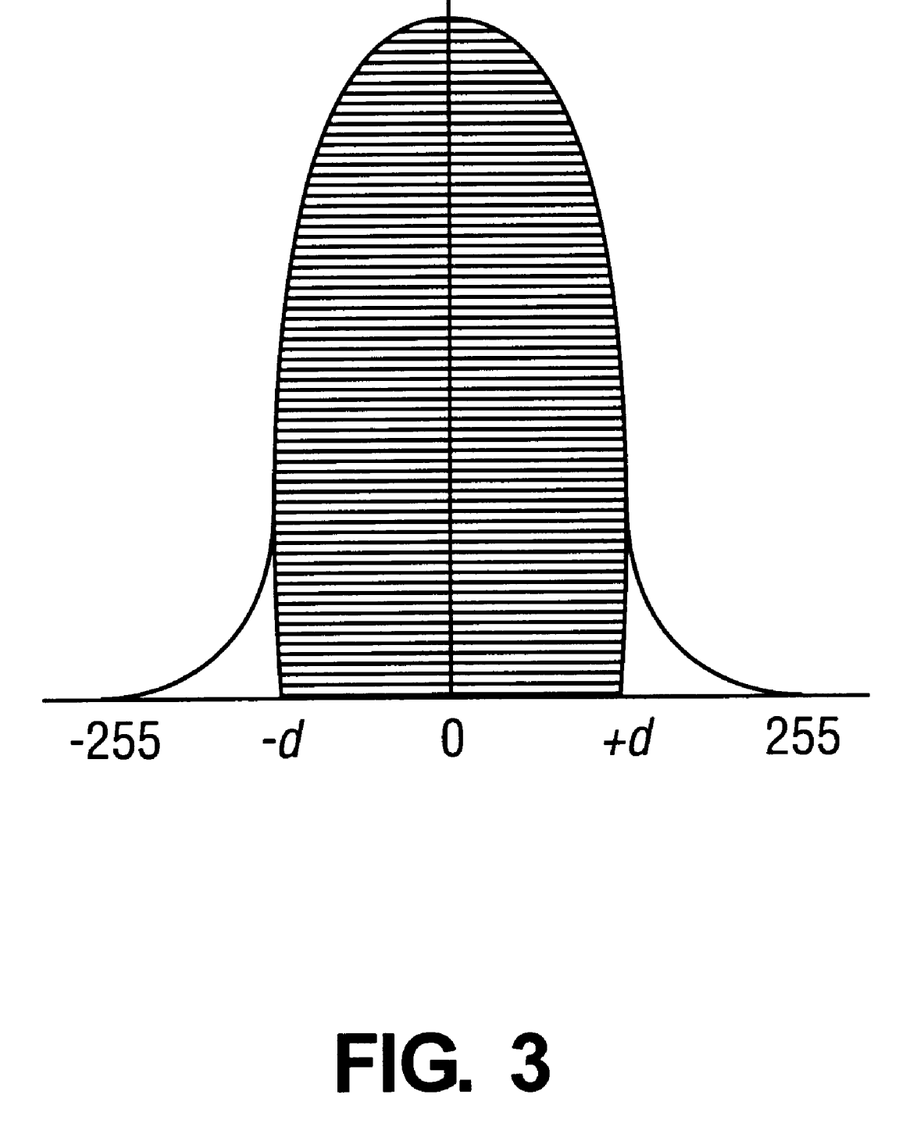
FIG. 3 illustrates a histogram of prediction errors for a typical image.

For instance, where quantized values range from −255 to +255, values in the range of −32 to +32 may be deemed to be low frequency values, while others may be deemed high frequency values. Since quantizer 213 reduces the initial set of error values to a smaller set of values, such a high and low frequency value breakdown will more efficiently encode that smaller set. The most significant error (and quantized error) information that is sensitive to the human eye belongs to the low frequency error range as shown in FIG. 3. This range (+d, −d) will vary depending upon characteristics (level of detail, edges, color) of the image. However, experimental results show that for a majority of images "d" is less than 32, for a quantized range of (−255, +255). According to one embodiment of pseudo-fixed length encoding, therefore, a fewer number of bits are allocated to encode values in that (−d, +d) range (low in frequency range) and a higher number of bits are allocated to encode higher frequency values, which fall beyond (−d, +d). The table of FIG. 4 and the associated description exemplifies such a break between high and low frequency and the associated encoding.

FIG. 2 also shows a decoder 240 which reconstructs image pixels based upon pseudo-fixed length encoded quantized error values. A pseudo-fixed length (PFLE) decoder 242 generates reconstructed quantized error values from the PFLE code. The quantized error values are their inverse quantized by an inverse quantizer 244 which is substantially similar to inverse quantizer 216 of encoder 210. Finally, a summation unit 240 adds the error value extracted by inverse quantizer 244 to a previously reconstructed pixel. The previously reconstructed pixel is added together with the error to generate the next pixel. The decoder (or decompression unit 240) and compression unit may each be hardware, software, firmware or a combination thereof and may be implemented on the same device or separate devices such as a camera and computer system. The compressed code generated by PFLE 215 can be stored and/or transmitted over a communication or network medium in a convenient format.

FIG. 3 illustrates a histogram of prediction errors to a typical image.

The bell-shaped histogram is a representation of the frequency of occurrence (y-axis) of each of the error or quantized error values (x-axis) as the case may be. The histogram is typical of an image and may show a Gaussian or Binomial (e.g., Poisson) distribution, depending upon the characteristics of the image. As FIG. 3 shows, the typical image will have a majority of error (or quantized error) values concentrated about (+d, −d), which is a narrow range of values. Traditional encoding schemes, such as variable-length encoding would use a number of bits corresponding linearly or geometrically to the value itself. For example, the number 32 would be represented by 5 bits, and so on. Such encoding is inefficient when applied to a reduced set of values such as a set of quantized error values. Further, variable-length encoding is clumsy because the decoding is more complicated, since the decoding must recognize the number of bits that characterize each value. Fixed length encoding is also inefficient in that a large number of bits are required to encode the high frequency numbers, and with a fixed length, these same large words are used to encode low frequency values. Since low frequency values predominate, as shown in the histogram, there is a larger data footprint for the encoded image with fixed length encoding. By contrast, pseudo-fixed length encoding according to the various embodiments of the invention would allocate a fewer number of bits to values occurring more frequently, but rather than doing so in a strictly variable sense, behaves more predictably. The efficiency of the encoding by pseudo-fixed length codewords is due partly to the nature of the image error distribution which is concentrated in a particular range. Though −255 to +255 are the endpoints of the distribution, it will be appreciated that these endpoints may vary according to the bit resolution of the error values and of a partial image's characteristics.

Figure 4:
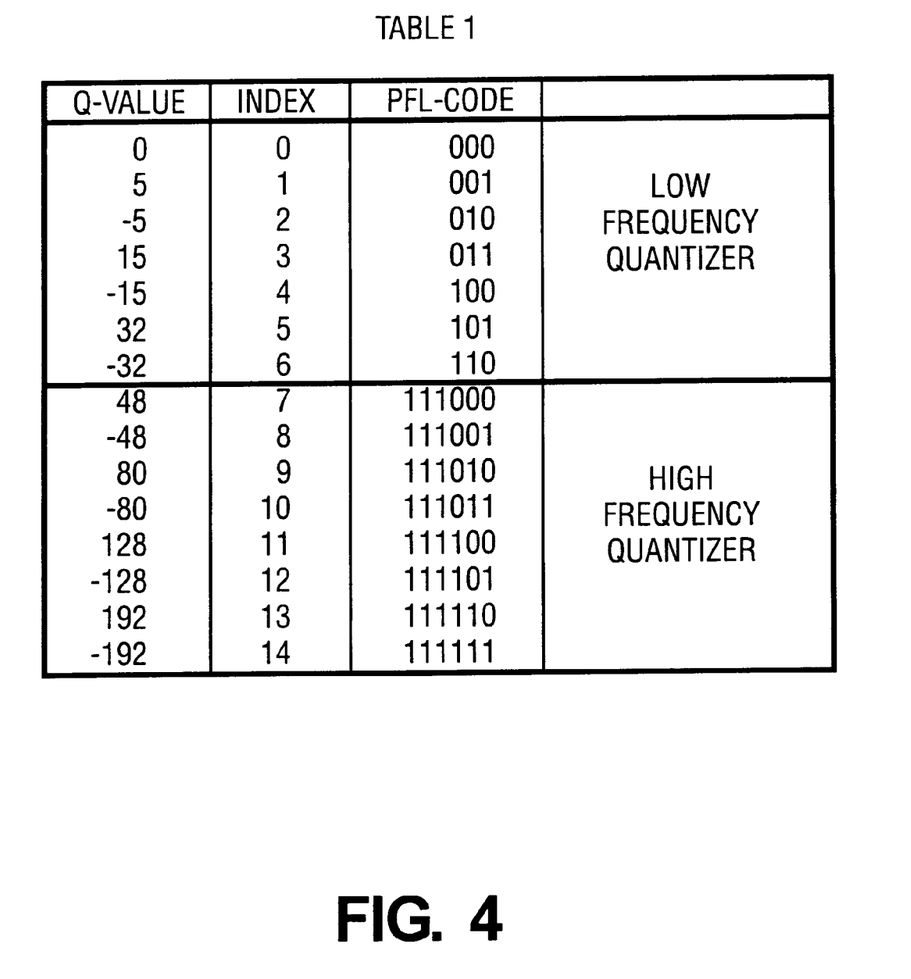
FIG. 4 is an exemplary pseudo-fixed length encoding table.

FIG. 4 is an exemplary pseudo-fixed length encoding table.

The table shows three columns. the first column "Q-Value" is a listing of quantized error values from an initial set of 511 error values. As shown in FIG. 4, the quantization formula used reduces those 511 error values to a set of 15 error values, 0, ±5, ±15, ±32, ±48, ±80, ±128, and ±192. Using ±32 as the endpoints for the low frequency range, the first 7 values shown in table are encoded using only 3 bits. The next 8 entries, from ±48 to ±192, are encoded using 6 bits. The quantized error result provides the parameters for the pseudo-fixed length encoding. In general, given a set M quantized error values which range from (−m, +m), the first $2^N-1$ quantized error values, where N is the total number of bits required to encode the maximum value of the range in question, will be encoded with N bits. This is illustrated by assigning each $2^N-1$ quantized error value with an index, ranging from 0 to $2^N-2$. The index values are then encoded as binary values. Thus, the quantized error value 15, being the 4th value in the table is assigned an index of 3. The index 3 is then encoded as 3 bits "011". Likewise, the next entry in the table, "−15" is indexed as 4, having an encoded 3-bit value of "100".

M, the total number of quantized error values to be encoded dictates the value of N in the following manner: if k fixed-lengths are desired, then M div k different code lengths will have to established. Every k quantized error values will be progressively encoded as a multiple of N bits, such that M div k=$2^N-1$ or N=$\log_2((M \text{ div } k)+1)$. The first k values are encoded in N-bits words while the next k values are encoded as 2N-bits words and so on. Applying this formula, the 15 quantized error values of FIG. 4 can be encoded in 3 bits and 6 bits for low frequency and high frequency values, respectively. When these codewords of 3 and 6 bits are arranged into bytes, for example, it would be desirable to ensure their proper decoding without the addition of overhead. A strictly variable-length encoding scheme must provide with the codeword a means of determining its size when packed in with other codewords. For example, FIG. 4 shows that in the exemplary Table 1, high frequency quantized error values, which are encoded in words with a length of 6 bits, all have prefix bits of "111". Since none of the low frequency codewords, which are encoded as 3 bits, have the value 111, this ensures that during decode, the high frequency and low frequency words will be distinguishable. For instance assume a packet sequence of bits as follows:

| Bit Number | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Word | 0 | 0 | 1 | 1 | 1 | 0 | 1 | 1 | 1 | 0 | 0 | 1 | 1 | 0 | 1 |

This packed data block sequence is exemplary of the encoded output generated by repeatedly indexed Table 1 with quantized error values. Assuming the data block is decoded left to right, and further assuming that the start of the data block is known, then the decoder will interpret the "0" in position 1 as indicting that the bits to follow cannot possible be representative or the high frequency range. Then the bits 1–3 ("001") are used to reverse look-up Table 1since there are only 3-bit or 6-bit values (low or high), and obtain the quantized error value "5". Next, bit 4, a "1" is indeterminate, as is bit 5, which is also "1", but at data block position 6, which is a "0", it becomes apparent that the value is a low frequency or 3-bit value. Thus, the bits 4–6 "110" are indexed against Table 1 to obtain a quantized error value of "−32". The next three bits, 7–9 "111" indicate to the decoder that the following three bits are also to be read since there is a high frequency value present. Thus, bits 7–12 or "111011" is used to obtain a quantized error value "−48".

Finally, as before, upon approaching the "0" in bit 14, the decoder recognizes that a 3-bit value is present, and hence "101" is decoded quantized error value "32". By reserving the highest or lowest code value in any particular range as the prefix for the next range, decoding will be simplified, without the need for accompanying indicators of code length as with strictly variable-length encoding schemes. Each range can be progressively represented by higher and higher multiples of N bits. Depending upon the quantization formula, many different combinations of pseudo-fixed lengths are possible. Further, depending on the desired quality or inherent characteristics of M image, the cut-off points of the various ranges (such as off +d, −d in FIG. 3) may also be varied.

Figure 5:
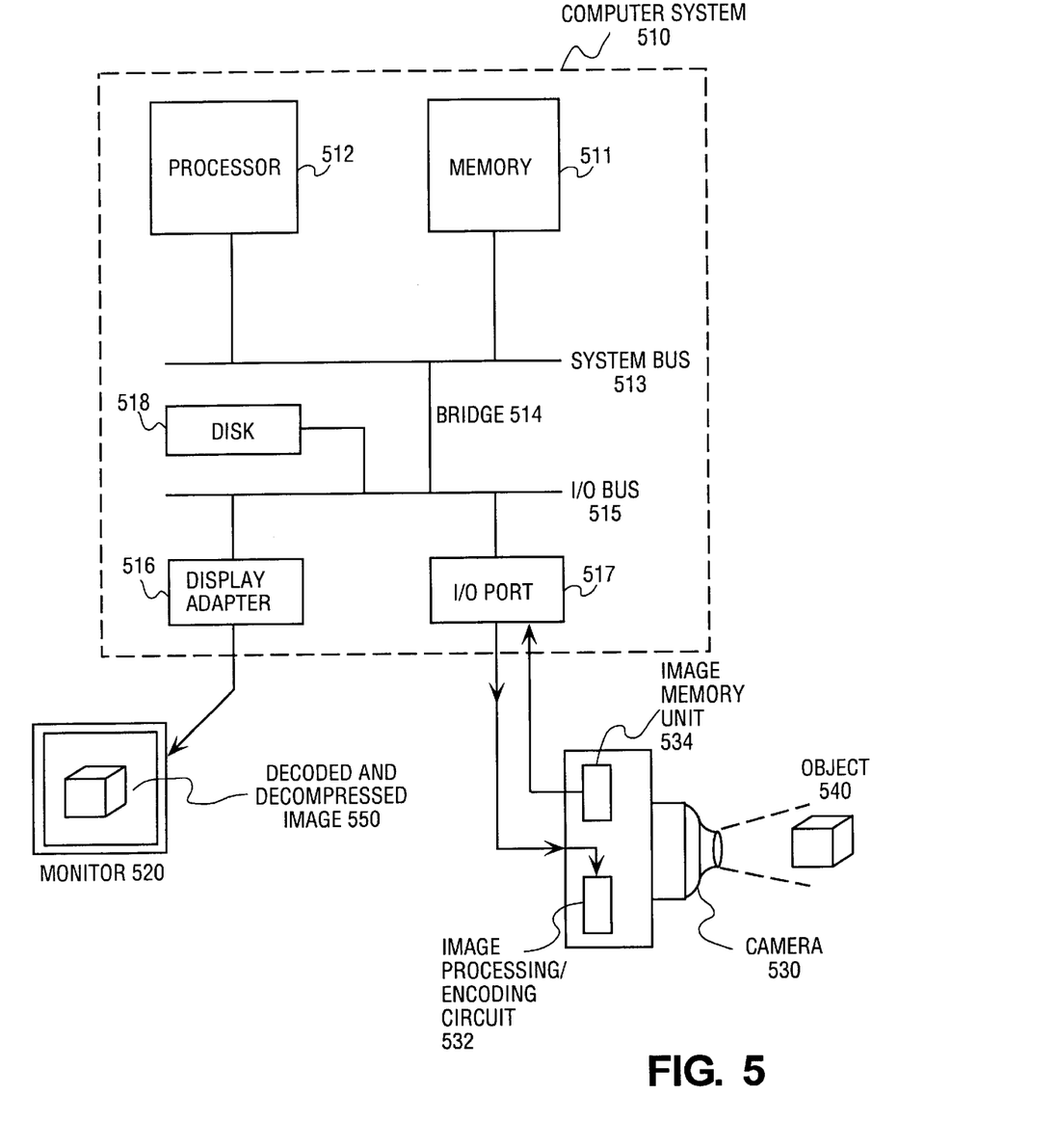
FIG. 5 is a system diagram of one embodiment of the invention.

FIG. 5 is a system diagram of one embodiment of the invention.

Illustrated is a computer system 510, which may be any general or special purpose computing or data processing machine such as a PC (personal computer), coupled to a camera 530. Camera 530 may be a digital camera, digital video camera, or any image capture device or imaging system, and is utilized to capture a sensor image of an object 540. Essentially, captured images are compressed by an image compression circuit 532 so that they can be efficiently stored in an image memory unit 534, which may be a ROM, RAM or other storage device such as a fixed disk. In most digital cameras, images are stored first and downloaded later. This allows the camera 530 to capture the next object quickly without additional delay.

Image processing in this embodiment of the invention operates as follows. First, a pseudo-fixed length encoding table, if not already compiled, is compiled using computer system 510. The compiling of pseudo-fixed length encoding tables according to desired quantization formulas or methods is achieved using a processor 512 such as the Pentium® (a product of Intel Corporation) and a memory 511, such as RAM, which is used to store/load instruction addresses and result data. The application used to compile the encoding table may be an executable file compiled from source written in a language such as C++. The instructions of that executable file, which correspond with instructions necessary to compute frequency ranges, set index values and corresponding pseudo-fixed length codewords into a table, may be stored to a disk 518 or memory 511. It would be obvious to one of ordinary skill in the art to program a computing machine to compile the image compression table.

Computer system 510 has a system bus 513 which facilitates information transfer to/from the processor and memory and a bridge 514 which couples to an I/O bus 515. I/O bus 515 connects various I/O devices such as a display adapter 516, disk 518 and an I/O port 517, such as a serial port. Many such combinations of I/O devices, buses and bridges can be utilized with the invention and the combination shown is merely illustrative of one such possible combination.

Once the table is compiled, it can be sent through I/O port 517 and loaded into image compression circuit 532 in a RAM or memory utilized by the image compression circuit 532. The table, once loaded, can thereafter be utilized by the image compression circuit 532.

When an image, such as an image of object 540, is captured by a sensor, the sensor captures for each pixel one of R, G, or B components and these pixel values are then sent to the image compression circuit 532. Image compression circuit 532 consists of ICs and other components which execute an image compression scheme such as predictive coding. The image compression circuit 532 calculates initial error values according to a predictive coding formula, and then, looks up both the corresponding quantized error value and Codeword equivalents according to pseudo-fixed length encoding for the error value and stores that into the image memory unit 534. By looking up the codeword values in the pseudo-fixed length encoding table, the compute intensive steps of bit-by-bit encoding do not have to be performed by the camera. The total cost of the camera is reduced by avoiding the additional circuitry used to perform the encoding of quantized error values. Once all pixel components are processed, the camera 530 can capture the next image. When the user or application desires/requests a download of images, the compressed images stored in the image memory unit as packed data (Codewords) and are transferred from image memory unit 534 to the I/O, port 517. I/O port 517 uses the bus-bridge hierarchy shown (I/O bus 515 to bridge 514 to system bus 513) to temporarily store the Codeword pixels into memory 511 or, optionally, disk 518.

The compressed images are decompressed by suitable application software (or hardware), which may utilize processor 512 for its execution. Since the pseudo-fixed length encoding table may be also downloaded to or compiled on the computer system, it can be reused to "look-up" in reverse the actual quantized error value corresponding to the Codeword. The quantized error values are inverse quantized and then used in an inverse predictive coding (or other corresponding image decompression scheme) to produce a decompressed image 550. Decompressed image 550 may then be rendered visually using a display adapter 516 onto a monitor 520 to which the computer system 510 may be connected. As discussed earlier, the decompressed image may have pixels which composite R, G and B values together by some method interpolation method and, thus, can produce higher-bit resolution images.

Figure 6:
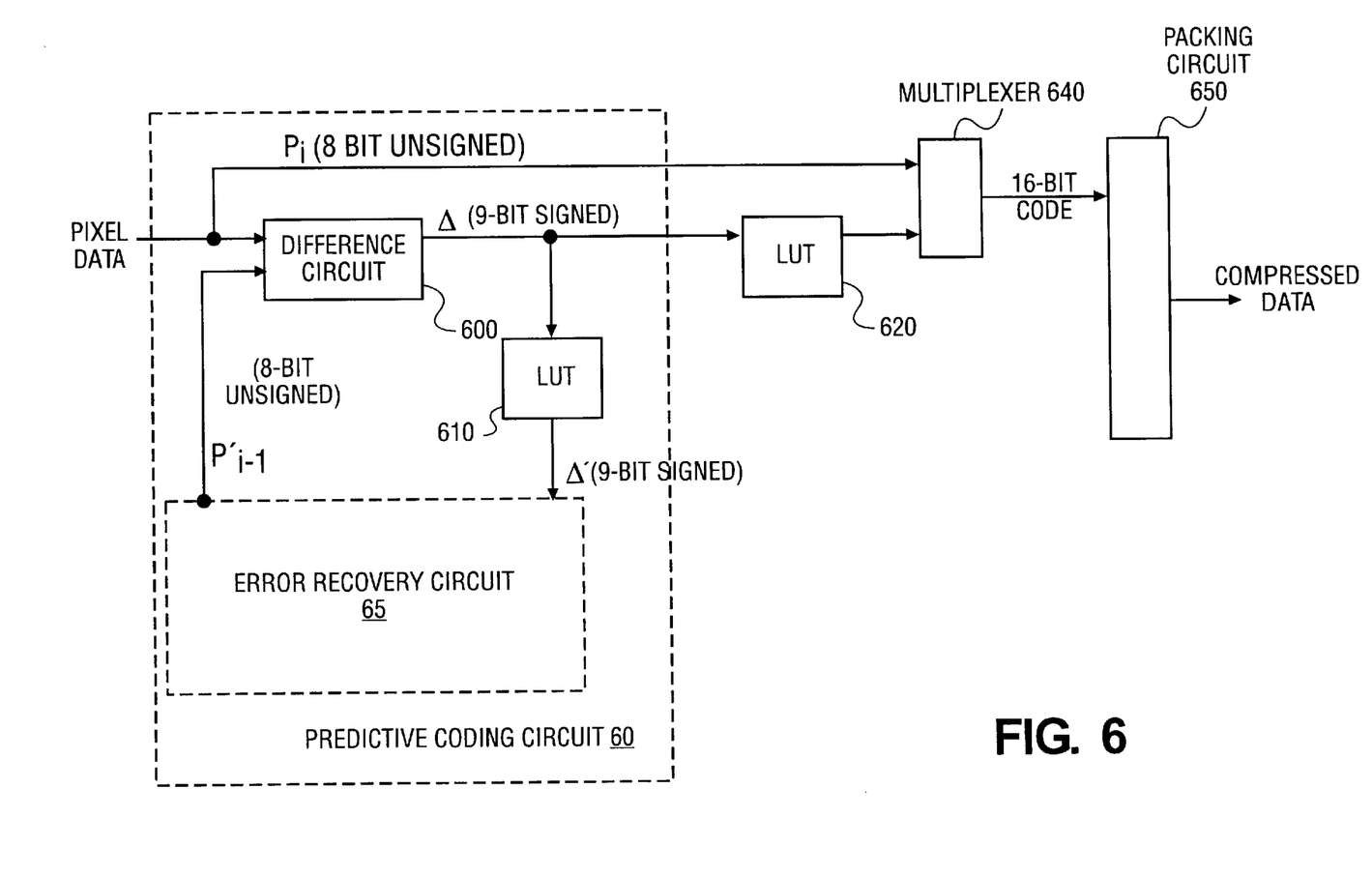
FIG. 6 is a block diagram of one embodiment of the invention.

FIG. 6 is a block diagram of one embodiment of the invention.

FIG. 6 represents a table look-up based image compression system. FIG. 6 is distinguishable from prior art image compression systems in several ways. First, a special predictive coding or adaptive decorrelation circuitry is utilized and second, look-up tables are employed to perform quantization and pseudo-fixed length encoding as described in various embodiments of the invention. The apparatus of FIG. 6 is advantageous in that the look-up tables may be implemented as RAM (Random Access Memory) and are, thus, less expensive and less consumptive of power than prior art systems that employ more complete circuitry. Though FIG. 6 shows one implementation of look-up table compression and encoding, it is merely exemplary. One skilled in the art can readily adapt the look-up table architecture to any image or data compression system or method.

FIG. 6 shows as input pixel data $P_i$ which originates from a scaling device or other component, of an image capture device or port configured to communicate image information. The pixel data $P_i$ represents the value(s) associated with defining a pixel in the image that compression is performed upon. This may be a single value which represents color, such as R(red), G(green) and B(blue) color plane component or a grouping of such values. Typically, each $P_i$ is a pixel. "component" (R, G or B), and is interpolated together with neighboring components to form a single screen renderable RGB mixed pixel. The mixing of pixel components is usually achieved when the image is finally output to a display or printer.

Each $P_i$, which is shown as an 8-bit unsigned value is input to a difference circuit 600. Difference circuit 600 computes the difference between a predicted previous pixel component $P'_{i-1}$ and the original pixel component $P_i$. The difference circuit 600 generates and provides as output a 9-bit signed value $\Delta = P_i - P'_{i-1}$, which is referred to as the "error" or delta value. As discussed below, each pixel component $P_i$ has a previous predicted pixel component $P'_{i-1}$ provided by the error recovery circuit 65. The previous predicted pixel component $P'_{i-1}$ is fed into the difference circuit for the next on future pixel component $P_i$.

A predicted pixel component $P_i'$ is generated by associating in linear combination previously visited neighboring pixel components. In predictive coding, any number of neighboring pixel component may be utilized to predict pixel component values. For instance, the one-dimensional predictive coding takes on one of either the north neighbor (same column, previous row) or the west neighbor (same row, previous column). Two dimensional predictive coding involves, for example, both north and west neighboring pixels. The exemplary embodiment of FIG. 6 shows one-dimensional predictive coding based on the west neighbor pixel.

Predictive coding circuit 60 operates as follows. Difference circuit 600 generates a $\Delta$, which is 9-bit signed value representing the difference between $P_i$ and $P'_{i-1}$. This "error" value, $\Delta$, is used as an address to a look-up table (LUT) 610. LUT 610 is a look-up table to compute an inverse quantized value. LUT 610 can store both a quantized value and an inverse quantized value for a given $\Delta$ or error. The LUT 610 outputs a "recovered" error value $\Delta'$ to be used in error recovery circuit is shown in FIG. 6.

The recovered error value $\Delta'$ output by LUT 610 is the result of both quantization and inverse quantization. For instance, an error value $\Delta=96$ may have a quantized value of 12. The quantized value 12, when inverse quantized will yield a recovered error $\Delta'$, for example, of 98. It is this quantization loss that facilitates compression. The quantization formula which is used to compile the look-up table may result in many values such as 96 and 98 as well, mapping to a quantized value of 12. When inverse quantized, the value 12 will always yield, in the example given above, an inverse quantized value of 98, whether "12" was obtained from quantizing an error value of 96 or 98.

This error, which is due to quantizing error values to a smaller set of values can potentially propagate through the entire row of pixels unless a recovery mechanism is applied. Error recovery circuit 65 seeks to reduce the propagation of error by feeding back and summing previous predicted pixel component values with future recovered error values $\Delta'$ for future predicted pixel components. The previous predicted pixel component $P'_{i-1}$ is also input to difference circuit 600 to be subtracted from the actual pixel component $P_i$. Error recovery circuit 65 is essentially the decompression or inverse of the forward image compression process. This simulates the prediction occurring at the receiver side (i.e., during decompression). As a result, the quantization error for each component remains localized for the particular pixel.

As mentioned above, predictive coding circuit 60 generates an error value $\Delta$ for each pixel component $P_i$. A second LUT 620 is employed to perform pseudo-fixed length encoding of the quantized error value. Again, for example, a Δ=96 may have a quantized value of 12. LUT 620 will store the full range of possible Δ values as addresses to index the quantized value and its codeword (encoded value). The codewords sent out by the packer circuit contain sufficient information to represent a compressed image and can later be decompressed to recover a slightly modified version of the original captured image sent to the predictive coding circuit as the set of $P_i$ values for the entire image.

In the example of FIG. 6, one-dimensional predictive coding using the west neighboring pixel components is utilized. Thus, the very first pixel component $P_1$ of a particular row j has no previous predicted pixel component $P_0'$ since no west neighbor exists for $P_1$. Therefore, $P_1$, the first pixel of every row, should be provided directly to the packer circuit to be encoded as is. To facilitate this operation, a multiplexer 640 selects the codeword provided by LUT 620 for all pixels in a row after $P_1$ and selects $P_1$ when the very first pixel component is to be encoded. The value selected by multiplexer 640, ether the codeword from LUT 620 or $P_1$, is packed by packing circuit 650.

In one alternate embodiment, two-dimensional predictive coding may be used instead of one-dimensional coding. Two-dimensional predictive coding will utilize both the north and west neighboring pixels, and though the look-up table approach will be similar, the feedback circuitry will vary. Such a two-dimensional predictive coding system is shown in FIG. 5 below.

The LUT 620 can therefore be a simple addressable memory such as a RAM which uses a value Δ as an address to look-up the pseudo-fixed length codeword. Such a RAM look-up table is inexpensive in comparison to binary encoding circuitry that would be traditionally utilized to perform the same functionality. For applications such as still image capture with a portable digital camera, the pseudo-fixed length encoding may be compiled in advance of the image capture with the same table of values utilized for all images captured. The table shown in FIG. 4 is representative of the contents needed in LUT 620. In other encoding schemes such as variable-length encoding LUT 620 would also need to store the length of the codeword. However, as described earlier, the length of the codeword is readily determinable by the first bits of the codeword itself. Thus, no length information needs to be passed along with the codeword.

The image compression apparatus shown in FIG. 6 is advantageous in that the complicated procedure of binary/codeword encoding is avoided. In binary/codeword encoding, a value is represented in some binary form, such as one's complement and is also further coded using a coding scheme such as the well-known Huffman coding. Such coding is executed bitwise, and thus, may utilize latches and logic gales implemented in CMOS. In various embodiments of the invention, pseudo-fixed length encoding is discussed. LUT 620 need only store the codewords that correspond to a particular error value. A precompiled look-up table, according to the various embodiments and modifications thereof of the invention, can achieve this end.

The exemplary embodiments described herein are provided merely to illustrate the principles of the invention and should not be construed as limiting the scope of the invention. Rather, the principles of the invention may be applied to a wide range of Systems to achieve the advantages described herein and to achieve other advantages or to satisfy other objectives as well.

What is claimed is:

1. A method comprising the steps of:
    compressing image data using a pseudo-fixed length image compression technique, said pseudo-fixed length allocating more bits to words that represent information significant to human vision; encoding into a pseudo-fixed length code a set of quantized error values, said pseudo-fixed length code encoding high frequency quantized error values and low frequency quantized error values with different fixed lengths, said low frequency values having a magnitude more visually significant than said high frequency values; and transferring said compressed image data to a destination for retrieval and decompression.

2. A method according to claim 1 wherein the step of compressing includes the steps of:
    generating a set of error values between said image data and predicted image data and quantizing said error values into a set of quantized error values such that said set of quantized error values has fewer values than said set of error values.

3. A method according to claim 2 wherein the step of transferring includes the steps of sequencing into words one or more pseudo-fixed length encoded quantized error values.

4. A method according to claim 1 further comprising the stop of decompressing said compressed image data into reconstructed image.

5. A method comprising:
    compressing image data using a pseudo-fixed length image compression technique by:
        generating a set of error values between said image data and predicted image data;
        quantizing said error values into a set of quantized error values such that said set of quantized error values has fewer values than said set of error values;
        encoding into a pseudo-fixed length code said set of quantized error values, said pseudo-fixed length code encoding high frequency quantized error values and low frequency quantized error values with different fixed lengths, said low frequency values having a magnitude more visually significant than said high frequency values; and
    transferring said compressed image data to a destination for retrieval and decompression by:
        determining the total number of quantized error values in said set of quantized error values;
        determining the number of different desired frequency ranges for said quantized error values, said frequency ranges defining said low frequency quantized error values and said high frequency quantized error values; and
        setting a fixed length for encoding quantized errors of a particular frequency range, a different fixed length being employed for each frequency range.

6. A method according to claim 5 wherein the number of different desired frequency range is 2.

7. A method according to claim 6 wherein the pseudo-fixed length used to encode low frequency quantized error values is half that of the pseudo-fixed length used to encode high frequency quantized error values.

8. An apparatus for image compression comprising: an error image generator configured to generate image error values; a pseudo fixed length encoder coupled to said error image of said encoder configured to encode said image error values into codewords of pseudo-fixed length, said pseudo-fixed length allocating more bits of words that represent information significant to human vision; wherein said pseudo-fixed length encoder includes a look-up table addressable by said error image values, said look-up table providing therefrom a corresponding quantized error value.

9. An apparatus according to claim 8 further wherein said look-up table provides said pseudo-fixed length codewords for each quantized error value.

10. An apparatus according to claim 8 wherein said error image generator includes a predictive coding circuit.

11. An apparatus comprising:

an error image generator configured to generate image error values; and a pseudo-fixed length encoder coupled to said error image of said encoder configured to encode said image error values into codewords of pseudo-fixed length an error image generator configured to generate image error values;

wherein said error image generator includes a predictive coding circuit including a difference circuit, a look-up table, and an error recovery circuit, said error recovery circuit providing one input to said difference circuit, said difference circuit having as a second input, pixel data, said difference circuit generating said image error values therefrom.

12. An apparatus according to claim 11 wherein said look-up table is indexed by the output of said difference and is configured to provide a recovered pixel value to said error recovery circuit.

13. An apparatus for image decompression comprising:

a pseudo-fixed length decoder configured to decode words into quantized error values from a look-up table addressable by said error image values, said look-up table providing therefrom a corresponding quantized error value.

14. An imaging system comprising:

a pseudo-fixed length image compression circuit for coupling to an imaging device configured to capture raw image data, said compression circuit configured to compress said raw image data, said pseudo-fixed length compression utilizing a set of look-up tables to perform said compression, the look-up tables are addressable said error image values, said look-up tables providing therefrom a corresponding quantized error value.

15. A system according to claim 14 wherein said stored compressed image data is output to data processing system.

16. A system according to claim 15 wherein said data processing system uncompresses said output image data utilizing a pseudo-fixed length decompression scheme.

17. A system according to claim 16 further comprising a display system, said display system configured to reorder said decompressed image data into a visually recognizable image.

18. A method comprising:

compressing image data using a pseudo-fixed length image compression technique;

transferring said compressed image data to a destination for retrieval and decompression;

generating a set of error values between said image data and predicted image data; encoding into a pseudo-fixed length code said set of quantized error values, said pseudo-fixed length code encoding high frequency quantized error values and low frequency quantized error values with different fixed lengths, said low frequency values having a magnitude more visually significant than said high frequency values; and quantizing said error values into a set of quantized error values such that said set of quantized error values has fewer values than said set of error values.

19. A method comprising:

compressing image data using a pseudo-fixed length image compression technique;

transferring said compressed image data to a destination for retrieval and decompression;

generating a set of error values between said image data and predicted image data;

quantizing said error values into a set of quantized error values such that said set of quantized error values has fewer values than said set of error values;

encoding into a pseudo-fixed length code said set of quantized error values, said pseudo-fixed length code encoding high frequency quantized error values and low frequency quantized error values with different fixed lengths, said low frequency values having a magnitude more visually significant than said high frequency values; and determining the total number of quantized error values in said set of quantized error values.

20. An apparatus for image compression comprising: an error image generator configured to generate image error values; a pseudo fixed length encoder coupled to said error image of said encoder configured to encode said image error values into codewords of pseudo-fixed length, said pseudo-fixed length allocating more bits to words that represent information significant to human vision; and a packing circuit configured to pack said pseudo-fixed length codewords for transport outside said apparatus.

* * * * *

UNITED STATES PATENT AND TRADEMARK OFFICE
CERTIFICATE OF CORRECTION

PATENT NO. : 6,285,796 B1 Page 1 of 1
DATED : September 4, 2001
INVENTOR(S) : Archarya et al.

It is certified that error appears in the above-identified patent and that said Letters Patent is hereby corrected as shown below:

Column 7,
Line 58, after "Table 1", insert -- , --.

Column 10,
Line 10, delete "$\Delta=P_i-P'_{i-1}$", insert -- "$\Delta=P_i-P'_{i-1}$ --.

Column 5,
Line 34, delete "$\sqrt[y]{31=5}$", insert $\sqrt{31}=5$ --.

Signed and Sealed this

Eighteenth Day of June, 2002

Attest:

Attesting Officer

JAMES E. ROGAN
Director of the United States Patent and Trademark Office